March 3, 1964     H. STABE ETAL     3,122,914
VISCOMETERS
Filed Oct. 13, 1958
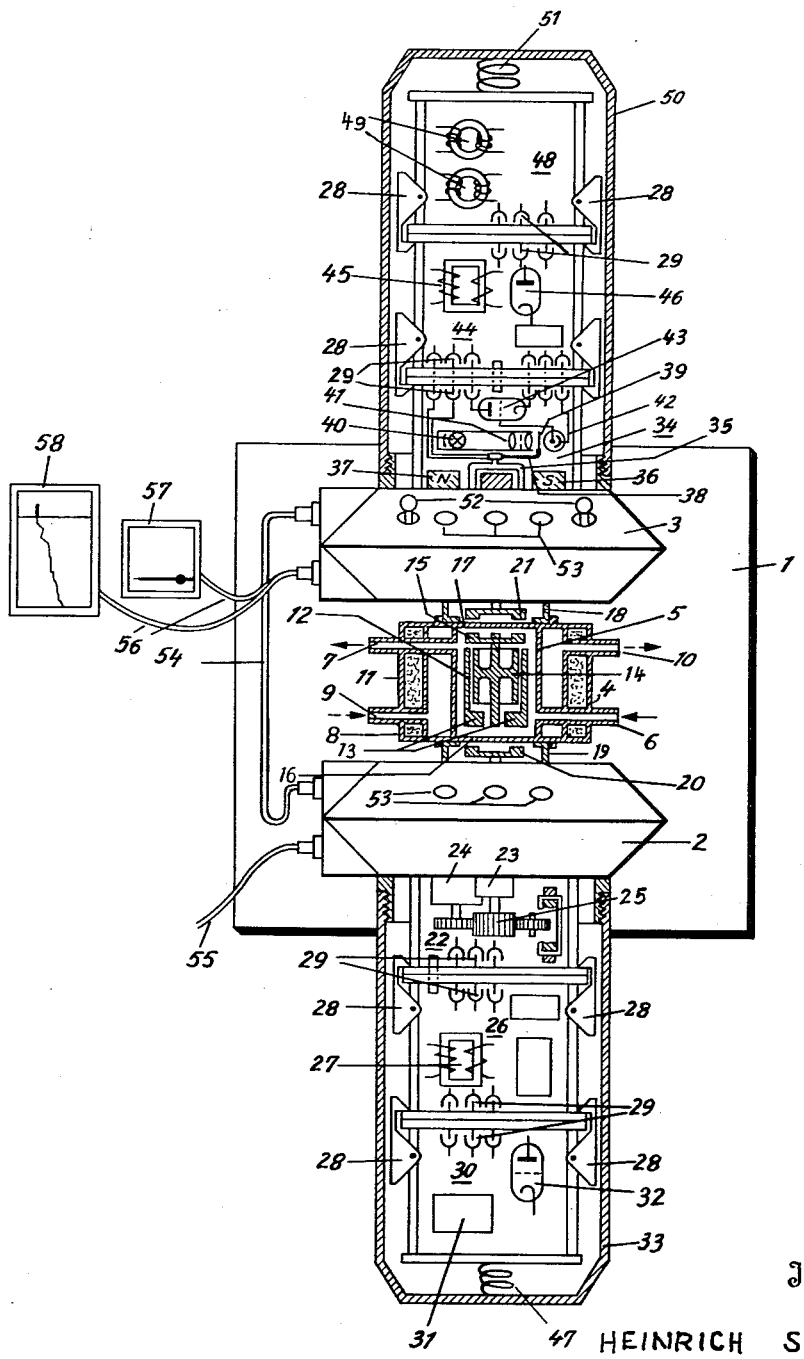
Inventors
HEINRICH STABE
BERTHOLD HAMBURGER
By F. R. Jenkins, Agent united States Patent Office 3,122,914
Patented Mar. 3, 1964

3,122,914
VISCOMETERS
Heinrich Stabe and Berthold Hamburger, Frankfurt am Main, Germany, assignors to Hartmann & Braun Aktiengesellschaft, Frankfurt am Main, Germany, a corporation of Germany
Filed Oct. 13, 1958, Ser. No. 766,882
Claims priority, application Germany Apr. 15, 1958
6 Claims. (Cl. 73—59)

The invention relates to improvements in apparatus for the determination of the consistency of a fluid, more particularly of the viscosity of a liquid, by measuring the torque transmitted through the viscous medium from a member rotating at constant speed to a second rotatable member arranged coaxially therewith. The invention is especially concerned with apparatus of the kind in which the measurement of the torque imparted to the entrained rotatable member is performed by a compensatory electrical measurement. Viscometers are required in industry and in the laboratory for a large number of purposes. One important application is, for instance, the measurement of the viscosity of lube oils at various temperatures. A knowledge of the viscosity of fluids is also of importance in various other technological fields.

Particularly in industrial applications it is desirable to have a viscometer which permits viscosities to be continuously measured and recorded, and which will give reliable and readily reproducible results. Another desirable feature of such instruments is that the development of a fault should not put the apparatus out of action for any length of time, that the fault should be immediately detectable, and that it should be capable of being remedied by unskilled personnel immediately at the site where the apparatus is in actual use. The improved apparatus proposed by the present invention satisfies these various needs. Based upon the principle of measurement above described it is capable of measuring viscosity continuously and of indicating or recording the results of the measurement on suitable instruments. The development of a fault, which may be indicated by the provision of warning lights, can be readily remedied since it is proposed to construct the apparatus of a plurality of self-contained, easily exchangeable units, so that any faulty unit can be replaced without delay and without requiring the apparatus to be dismantled, sent away for repairs, or attended to by specially skilled personnel.

According to the invention the proposed viscometer comprises at least three self-contained, readily exchangeable unit assemblies, adapted to be connected together by readily releasible means of attachment and mounted on a common support, one unit assembly consisting substantially of the measuring chamber containing the co-acting torque transmitting and torque receiving rotary members immersed in the tested medium, a second unit assembly containing the drive means for rotating the torque transmitting rotary member at a predetermined unvarying constant speed, and the third unit assembly containing an electrical measuring system for measuring the torque imparted to the entrained rotary member, by the generation of a compensating opposed acting torque.

It is further proposed that any auxiliary means that may be required, such as transformers and rectifiers for deriving the required power from a commercial source of electricity, means for the generation of a constant frequency alternating current for supply to the constant speed drive means, equipment for applying a temperature correction to the measured result, and so forth, should each be assembled in separate self-contained exchangeable units adapted to be affixed to the other units or to a common support by readily releasible means of attachment.

A special feature of the invention which materially contributes towards permitting the exchangeable units to be easily detached consists in that the transmission of rotary motion from one unit to the other, for instance from the driving unit to the constant speed rotary member in the measuring chamber and from the entrained rotary member to the measuring unit is effected through magnetic coupling devices which operate through the non-magnetic walls of the assembled neighbouring units.

According to another feature of the invention it is proposed to provide warning lamps for indicating that the individual associated units are in operation and more particularly for drawing visual attention to the development of a fault in such manner that the faulty unit can be immediately replaced without loss of time.

In a preferred form of construction of the compensatory measuring unit the electrical measuring device is embodied in a moving coil instrument connected in series with a variable resistance constituted in valve means controlled by a light-sensitive cell the illumination of which varies with the deflection of the movable coil, the current flowing through the variable resistance imparting a torque to the moving coil which opposes the torque transmitted from the entrained rotary member in the measurement chamber.

These and other features will now be more particularly described with reference to an illustrative embodiment of the invention shown in the accompanying drawing which represents a sectional elevation of a viscometer constructed in the manner herein proposed.

The apparatus is mounted on a baseplate indicated in the drawing by 1. The baseplate carries two supports 2 and 3 arranged centrally the one above the other. The space between the two supports 2 and 3 is adapted for the insertion therein in accurate central alignment of a measuring chamber 4 which forms a separate self-contained exchangeable structural unit and which will be hereinafter described in greater detail. In the drawing this measuring chamber is shown in schematic elevational section. It comprises a completely closed chamber 5 of cylindrical shape with one pipe branch for the admission and one for the discharge of the viscous medium which is to be measured. During the measurement the medium which enters at 6 and leaves at 7 fills the chamber completely. The chamber 5 is surrounded by a jacket 8 filled with a liquid medium, such as water, maintained at a steady controllable temperature. This latter medium enters the cylindrical jacket through an admission pipe 9 and leaves through a discharge pipe 10, its temperature being maintained at any desired but constant level by means of a thermostat not specially shown in the drawing. A hollow cylindrical casing 11 envelops the jacket 8 and contains a heat insulating material. Mounted inside the innermost chamber 5 which constitutes the actual measuring cell is a rotatable cylinder 12. One end of this cylinder carries a magnet with poles 13 which form one half of a magnetic coupling. Within cylinder 12 is another cylinder 14 of slightly smaller diameter than that of cylinder 12. Cylinder 14 is freely rotatable inside cylinder 12 and, secured to its shaft, it is a further magnet 15 which likewise forms one half of a second magnetic coupling. The floor 16 of chamber 5 as well as its cover 17 consist of non-magnetic material. Arranged opposite the poles 13 of the first mentioned magnet is a rotatable magnet 20 which together with magnet 13 constitutes one magnetic coupling. Opposite magnet 15 on the outside of the non-magnetic cover 17 is a further rotatable magnet 21. Magnets 15 and 21 together form the second magnetic coupling. As has been mentioned the measuring chamber 4 can be inserted as a unit between cylindrical adapters 18 and 19 secured to the supports 2 and 3 and centralised in such a way that the axes of the two cylinders 12 and 14 will exactly align with the axes of the two magnets 20 and 21. A further unit 22 containing means for driving magnet 20 at a uniform constant speed of rotation is arranged to be conveniently attached to the supporting member 2. This unit 22 comprises a synchronous motor 23 as well as an asynchronous motor 24, the two motors being geared together at 25, or alternatively unit 22 may contain only a self-starting synchronous motor. Detachably fitted to this exchangeably mounted driving unit 22 is a further assembly 26 which represents a unit for connection to a commercial source of electrical energy and comprising transformers 27, rectifiers, and other suitable elements. Attachment of such a unit to the drive unit 22 is by means of clips 28, whereas the necessary electrical connections are made by pin and socket plug-in type contacts 29, fitted into the base-plates of the two units 22 and 26. A further easily detachable unit 30 is attached to the bottom of unit 26, the means of attachment likewise consisting of clips 28 and the required electrical connections being established by plug-in type contacts 29. Unit 30 contains the necessary elements for the generation of a current of constant frequency. These elements are schematically indicated in the drawing and comprise a quartz oscillator 31 and an amplifier 32 employing either electronic valves or transistors. The three units 22, 26 and 30 are enclosed within a protective cover 33 which can be pushed over the assembled units from below and screwed on to a threaded adapter on the supporting member 2. A compression spring 47 inside the protective cover 33 serves to urge the unit assembly 22, 26 upwards when the cover is in position and thus to relieve the load on the clips 28. Above the measuring unit 4 and detachably affixed to the upper supporting member 3 is a unit 34 containing a torque compensator. This torque compensator substantially comprises an electrical moving coil system of which the coil holder 35 is rotatably connected with magnet 21 of the upper magnetic coupling. The moving coil can move freely in the field between the pole shoes 36 and 37 of a magnet. Affixed to the moving coil 35 is a pointer arm 38 which carries an opaque vane or mask 39 disposed in the path of a beam emitted by a source of light 40 associated with a suitable optical system 41 and a photo-electric cell 42. The photoelectric cell is connected to the grid of an electronic valve 43 or to the control electrode of a transistor amplifier. According to the position of the pointer arm 38 and of the mask 39 the intensity of illumination of the photocell 42 varies. Surmounting the torque compensator unit 34, the effect of which will be later described in greater detail, is a further unit 44 for connecting to commercial supply current, likewise secured in a readily detachable manner by clips 28 and also containing transformers 45, rectifiers 46, and so forth, electrically connected with the compensator unit by means of pin and socket plug-in type contacts 29. Above this mains unit 44 is yet another easily exchangeable unit 48 containing elements for applying a correction for temperature. These elements may consist for instance of transducers 49. This unit 48 is likewise connected electrically with unit 44 by means of plug-in type contacts and mechanically attached thereto by clips 28. A protective cover 50 encloses the three units 34, 44 and 48 and is arranged to be threadedly secured to the upper supporting member 3. This cover also contains a compression spring 51 which assists in holding the three units 34, 44 and 48 together when the cover is in position. Conveniently, the two cylindrical covers 33 and 50 may be provided with cooling fins to dissipate the heat generated within. The supporting members 2 and 3 are fitted with switches 52 for controlling the several units as well as with warning lamps 53 which glow when the associated unit is operative or, alternatively, indicate the presence of a fault in any particular unit of the instrument. A cable 54 connects the upper with the lower assembly, whereas a cable 55 supplies the necessary electrical power and can be connected to the mains. A further cable 56 connects up with an indicating and/or a recording instrument 57 and/or 58.

The apparatus that has been described operates as follows:

During operation the medium of which the consistency is to be measured flows continuously through the measuring chamber 5. The annular space between the outer cylinder 12 and the inner cylinder 14 is therefore completely filled with the medium upon which the measurement is to be performed. By means of the synchronous motor 23 the outer cylinder 12 is rotated at constant speed. The rotary motion of the synchronous motor is transmitted to the cylinder 12 inside chamber 5 because the magnetic coupling magnet 20 which is directly rotated by motor 23 entrains magnet 13 which is in turn mechanically coupled with cylinder 12. The viscosity of the tested medium between the two cylinders 12 and 14 causes some of the torque to be transmitted to cylinder 14 which is therefore deflected and simultaneously turns magnet 15. The torque imparted to the inner cylinder is transferred by magnet 15 through the unmagnetic wall 17 to magnet 21 which is mechanically connected with the moving coil 35 of the compensating unit 34. A definite torque is therefore transmitted to the moving coil. This torque causes a deflection of the pointer arm 38 and of the mask 39, partly withdrawing the mask from the path of the beam emitted by the light source 40 and allowing it to illuminate the light sensitive cell 42. The voltage induced in the light-sensitive cell is applied to the control grid of valve 43 and permits a current to pass through the valve depending upon the intensity of illumination to which the light-sensitive cell 42 is exposed. In other words, the photocell 42 in conjunction with the amplifier 43 constitute a variable resistance. The current flowing through this resistance is passed through the moving coil 35 in a direction which will give rise to a torque that opposes the torque imparted to the coil by cylinder 14 through the magnetic coupling 15, 21. A state of equilibrium will ensue between the two torques and the current which then flows through the moving coil 35 and the variable resistance formed by the light-sensitive cell and the amplifier must be directly proportional to the torque imparted to cylinder 14. This latter torque is in turn dependent upon the speed of rotation of cylinder 12 and at the same time upon the consistency, i.e. the viscosity of the medium in the annular gap between the two cylinders 12 and 14. Therefore, if the speed of rotation of cylinder 12 is constant the torque applied to cylinder 14 and hence the current flowing through the moving coil 35 will provide an accurate measure of the viscosity of the medium that is being tested. This current is now taken to unit 48 where it is transformed into a potential difference which is modified according to the temperature of the tested medium. To this end a temperature sensitive element, such as a resistance thermometer, is immersed in the tested medium and electrically connected with the transducers 49 in unit 48. The modified potential difference is then applied through cable 56 to the indicating instrument 57 and/or recording instrument 58.

We claim:

1. Apparatus for the determination of the consistency of a fluid, more particularly of a viscosity of a liquid, by measuring the torque transmitted through the viscous medium from a member rotating at constant speed to a second rotatable member arranged coaxially therewith comprising at least three self-contained, readily exchangeable unit assemblies adapted to be connected together by readily releasable means of attachment and mounted on a common support, one unit assembly consisting of a closed measuring chamber having inlet and outlet connectors and for containing the fluid; rotary torque transmitting and torque receiving members completely within the chamber and engageable with the fluid for the transmission of torque from the former to the latter member;

said chamber being substantially hermetically sealed but provided with inlet and outlet ducts, the chamber having substantially walls of non-magnetic material to which the respective axes of the rotary members are substantially perpendicular, a second unit assembly containing drive means for rotating the torque transmitting rotary member, at a predetermined unvarying constant speed, and the third unit assembly containing an electrical measuring means for measuring the torque imparted to the second rotary member, by the generation of a compensating opposed acting torque.

2. In a viscosity meter, a fluid holding chamber having coaxial radially spaced rotary cylindrical members therein for exchange of torque through the medium of the fluid, the chamber having respectively continuous opposed walls of non-magnetic material to which the axis of the members is substantially perpendicular, a drive device mounted on one of said walls and detachable therefrom, a magnetic coupling effective through said continuous wall for driving one of the members and a sensing device for measuring the torque transmitted to the other member and disposed adjacent the other wall, and a second magnetic coupling connecting the sensing device to said other member through the other continuous wall.

3. In a viscosity meter as claimed in claim 2 said devices being made up of a plurality of units all having walls substantially parallel with the chamber walls and releasably clamped together and having electrical components; structure carrying the chamber at each wall thereof; and caps on the structure for covering said devices.

4. In a viscosity meter as claimed in claim 3, at least two of said units being adjacent and provided with male and female electrical connections for enabling the ready disconnection of said components for replacement of a unit.

5. A viscosity meter comprising a vertical base plate; two outstanding supports on the plate one above the other; a test-liquid non-magnetic chamber between and removably mounted on said supports; co-axially vertical liquid engaging cylindrical members in the chamber mounted for rotation in torque exchange relationship through the medium of the test liquid; each member being provided with a magnetic coupling member at an end thereof and adjacent upper and lower walls respectively of the container; an axially vertical synchronous motor below the lower support and carrying a half a magnetic coupling element for action with one of the coupling members; means for mounting the motor on the support; a horizontal platform fast with respect to the motor; control assemblies having rigidly spaced upper and lower platforms successively disposed below the horizontal platform and adjacent to each other, clips for holding adjacent platforms to each other and the assemblies to the lower platform; an inverted hollow cap threaded on the lower support and housing the motor and assemblies; a spring in the hollow of the cap and compressed between the cap and lower platform of the lowermost assembly to prevent undue strain on the clips; a sensing means mounted on the upper support for sensing the angular position of the magnetic coupling member of the other cylindrical member; and a hollow upper cap on the upper member and housing the sensing means.

6. A viscosity meter comprising a base; a closed chamber having opposed parallel non-magnetic walls and provided with inlet and outlet tubes for containing liquid under test; means for detachably mounting the chamber on the base; first and second coaxial rotary members in the chamber in engagement with the liquid and close enough together so that rotation of the first will apply a torque to the second through the medium of the liquid, the axis of members being perpendicular to the walls; magnetic coupling elements on the respective rotary members, for coacting with respective magnetic fields outside the chamber; a synchronous drive motor and mount therefor carrying a drive magnetic coupling element for driving the first cylinder, the mount being detachably mounted on the base, the mount including a first platform parallel with said walls; a control system assembly for supplying current to the motor and including a crystal oscillator to control the frequency of the current; a frame having a second platform disposed against the first and carrying the system assembly, clip means for detachably holding the first and second platforms together so that the assembly may be readily separated from the motor mount for exchange or repair; a moving coil and a driven magnetic coupling element therefor turnable with the second rotary member; a detachable framework for mounting the coil and associated coupling near the chamber and fast with respect to the base; a magnet in inductive relationship with the coil; a source of light and cooperating photoelectric cell fixed on the framework; a mask turnable with the coil into and out of the light path between the cell and source; means for applying current to the coil to tend to turn same with respect to said magnet according to the position of the mask and light path and counter to the direction of rotation of the second member; means for measuring said current; said framework having a flat base member parallel with said walls; a support for the means for applying current and having a second base member disposed against the flat base member; and means for holding the two base members detachably together.

References Cited in the file of this patent

UNITED STATES PATENTS

| | | |
|---|---|---|
| 1,641,380 | Geyer | Sept. 6, 1927 |
| 2,142,854 | La Pierre | Jan. 3, 1939 |
| 2,354,563 | Weisse | July 25, 1944 |
| 2,472,019 | Kinderman | May 31, 1949 |
| 2,487,783 | Bergman | Nov. 15, 1949 |
| 2,519,378 | Kilpatrick | Aug. 22, 1950 |
| 2,529,481 | Brewer | Nov. 14, 1950 |
| 2,550,052 | Fay | Apr. 24, 1951 |
| 2,563,567 | Wakefield | Aug. 7, 1951 |
| 2,601,780 | Baecher | July 1, 1952 |
| 2,757,364 | Hood | July 31, 1956 |
| 2,828,621 | Von Rosenberg | Apr. 1, 1958 |

FOREIGN PATENTS

| | | |
|---|---|---|
| 844,362 | Germany | July 21, 1952 |